3,239,480
Patented Mar. 8, 1966

3,239,480
POLYURETHANES SYNTHESIZED WITH THE AID OF CARBOXYLIC ACID SALTS
Erwin Windemuth and Friedrich Möller, Leverkusen, Germany, assignors to Farbenfabriken Bayer Aktiengesellschaft, Leverkusen, Germany, a German corporation
No Drawing. Filed Jan. 28, 1963, Ser. No. 254,486
Claims priority, application Germany, Feb. 3, 1962, F 35,913
12 Claims. (Cl. 260—31.2)

This invention relates to polyurethane plastics and more particularly to the use of salts as accelerators for isocyanate reactions.

Isocyanates react readily with compounds having reactive hydrogen atoms and depending on the nature of the functional groups on which the hydrogen atoms are situated, urethanes, carboxylic acid amides, ureas and the like are formed. It is possible in particular, by means of the isocyanate polyaddition process, to produce synthetic plastics which have been introduced into practically all spheres of industry. In the production of these synthetic plastics, the concurrent use of reaction accelerators is frequently desirable since otherwise reaction times which are too long or increased reaction temperatures are necessary. The following compounds have, for example, proved satisfactory for this purpose: tertiary amines, metal compounds soluble in at least one of the reactants and compounds which are able to form hydroxyl ions or substituted hydroxyl ions. The use of such compounds often, however, causes disadvantages which make it technically difficult and sometimes impossible for these additives to be used; this is because the processing of the complete batch has to take place immediately after adding the reaction accelerator. If an effort is made to avoid this disadvantage by the use of smaller quantities of accelerator, the so-called pot life is certainly extended, but the acceleration of the reaction speed is reduced to a level which is no longer of interest. The use of reaction accelerators with isocyanate reactions has therefore resulted in every case in a shortening of the pot life as a very undesirable adjunct to the desired acceleration effect.

It has further been proposed to use salts of tertiary amines and a carboxylic acid such as the salt of methyl morpholine and acetic acid, e.g. U.S. Patent 2,842,506, but these salts are subject to the foregoing disadvantages.

It is therefore an object of this invention to provide a method of catalyzing the reaction between an organic polyisocyanate and a compound containing active hydrogen containing groups as determined by the Zerewitinoff method which is substantially devoid of the foregoing disadvantages. Another object of this invention is to provide an improved method of making polyurethane plastics which may be either cellular or homogeneous and the resulting products. Still a further object of this invention is to provide improved catalysts for the production of polyurethane plastics which decompose on reaction to leave only desirable products in the resulting polyurethane plastic. Still another object of this invention is to provide an improved tertiary amine catalyst for the production of polyurethane plastics. A further object of this invention is to provide improved coating compositions which have improved pot life.

The foregoing objects and others which will become apparent from the following description are accomplished in accordance with the invention, generally speaking, by providing a method of catalyzing the reaction of an organic polyisocyanate with an organic compound having active hydrogen containing groups as determined by the Zerewitinoff method which comprises the use of salts of tertiary amines, quaternary ammonium ions or of alkali metals with carboxylic acids having a dissociation constant greater than $1 \times 10^{-3}$, which readily decompose by decarboxylation into carbon dioxide and organic compounds.

These salts cause an acceleration of the reaction, especially at elevated temperatures, without simultaneously shortening the pot life of the batches obtained to a level which is unacceptable for industrial use.

Carboxylic acids which have, in aqueous solution at 25° C., a dissociation constant greater than $1 \times 10^{-3}$ and which, due to their constitution, readily undergo decarboxylation into non-reactive fractions that is to say which only produce organic compounds as decarboxylation products in addition to carbon dioxide may be used as acid components of the salts employed according to the invention. The capacity for decarboxylation is also pronounced with the salts of the aforementioned type, the amine component or the alkali being reformed on decarboxylation and thus the known activating action of these compounds is used in the isocyanate reactions.

It must be pointed out that both of these limits are important, i.e. the acid must have a relatively high dissociation constant above $1 \times 10^{-3}$ and it must dissociate into carbon dioxide and the organic component. In other words, oxalic acid ($K = 6.5 \times 10^{-2}$) and maleic acid ($K = 1 \times 10^{-2}$) are not contemplated as they have the disadvantages of the prior art and do not properly decompose.

Whether an acid satisfies both the necessary requirements mentioned above may readily be determined by an additional decarboxylation test with the knowledge of its dissociation constant which can be found by known methods. For carrying out this test, 100 ml. of a normal solution of the acid in question in solution in acetone as solvent may be introduced into a stirrer-type vessel which is connected through a reflux condenser to a device for measuring the quantity of $CO_2$ liberated. After heating to 50° C., 100 ml. of a normal solution of dimethyl-(3-ethoxypropyl) amine in acetone are added to the acid solution with stirring. The reaction mixture is maintained during the test at 50° C. and a thorough mixing of the components is assured by stirring. An acid is suitable according to the invention if at least 2000 ml. of $CO_2$ are split off during 30 minutes.

Any suitable acid meeting both the requirements may be used and the following are to be mentioned specifically as examples of suitable acid components: trichloroacetic acid, tribromoacetic acid, chlorodibromoacetic acid and nitroacetic acid. Particular reference is to be made to trichloroacetic acid. Monocarboxylic acids are preferred.

Any suitable tertiary amine may be used including, for example, aliphatic, cycloaliphatic, araliphatic and the like tertiary amines. The preferred ones have the general formula

R being a linear or branched, saturated or unsaturated, aliphatic, cycloaliphatic or araliphatic hydrocarbon radical which can also contain hetero atoms such as oxygen, sulphur or nitrogen. Specific examples of R are, for example, methyl, ethyl, propyl, butyl, hexyl, octyl, lauryl, stearyl, cyclohexyl, benzyl, isopropyl, propenyl, butene-2-yl, $CH_3-CH_2-S-CH_2-$, $CH_3-CH_2-O-CH_2-CH_2-$, $(CH_3)_2-N-CH_2-CH_2-$ and the like. R preferably represents an alkyl radical with more than 8, and most preferably up to 18, carbon atoms. R' represents an alkyl radical with up to 4 carbon atoms such as methyl, ethyl, propyl, butyl and the like. Examples of compounds of this formula include dimethyl butylamine, dimethyl benzylamine, dimethyl-(3-ethoxypropyl)-amine, dimethyl cyclohexyl amine and dimethyl stearyl amine. Triethyl amine, diethyl butyl amine, tri-n-propyl amine and tri-n-butyl amine may also be used although their action may be less strong. Also suitable are tertiary amines of the general formula

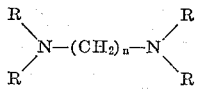

in which R has the same meaning as indicated above and $n$ represents an integer larger than 1; preferably 1 through 6. Examples of this type are tetramethyl ethylene diamine, tetramethyl tetramethylene diamine, tetramethyl hexamethyl diamine and the like. Permethylated diethylene triamine and triethylene tetramine, methyl or ethyl morpholine, dimethyl piperazine, N-methyl-N'-(2-dimethyl amino ethyl)-piperazine, 1-dimethyl amino-3-(N-methyl stearyl amino)-propane and 1,4-diazabicyclo-(2,2,2)-octane and the like may also be used. Pyridine or substituted pyridines such as benzyl pyridine are also suitable.

Tertiary amines containing hydroxy groups, such as dimethyl ethanolamine, diethyl ethanolamine, N-methyl diethanolamine, N-butyl diethanolamine, triethanolamine and the like as well as addition products of low or relatively high molecular weight obtained from primary and/or secondary monoamines or polyamines and alkylene oxides such as ethylene oxide, propylene oxide, 1,2- or 2,3-butylene oxide, styrene oxide, epichlorohydrin and the like can also be used.

It is sometimes also advantageous if these tertiary amines containing hydroxyl groups are incorporated into other polyoxy compounds, for example by esterification, linking with polyisocyanates or addition of epoxides to primary or secondary amines.

For forming a salt with the aforementioned acids, there are also suitable compounds which are able to form hydroxyl ions or substituted hydroxyl ions and which can be represented by the general formula

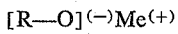

in which R represents hydrogen, alkyl, aryl, aralkyl, or cycloalkyl group which may be straight or branched chain, saturated or unsaturated, and which may also contain hetero atoms such as oxygen, sulphur, nitrogen or substituents once or several times in the molecule. $Me^{(+)}$ represents an alkali metal such as lithium, sodium, potassium, rubidium, cesium and the like or a quaternary ammonium ion such as the tetramethyl ammonium ion and the like. The grouping

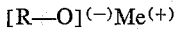

may be present several times in the molecule.

The organic radical R may be any suitable aliphatic group such as methyl, ethyl, n-propyl, isopropyl, n-butyl and the like; any suitable aryl radical such as phenyl, naphthyl and the like; any suitable aralkyl radical such as benzyl, alpha-phenyl ethyl and the like or any suitable cycloalkyl radical such as cyclohexyl and the like. Moreover, the aliphatic group may be unsaturated such as ethenyl, 1-propenyl, 2-propenyl, 2-butenyl and the like, or contain hetero groups as those given above for example.

The accelerators to be used according to the invention are preferably produced just before their use by combining equivalent quantities of their components and are then added to the mixture to be activated. It is usually desirable to use a slight excess of the acid component, but an excess of tertiary amine or alkali is not advisable since in this case the pot life of the mixtures are greatly reduced. The use of solutions of the accelerator components is usually advantageous and may be utilized in all those cases where solutions of compounds with reactive hydrogen and isocyanates are processed. Such as is the case, for example, with lacquers and coatings of support materials and in the production of support-free foils, impregnations, adhesive bonds and similar operations. The salt solutions are not usually stable for relatively long periods since the decarboxylation of the acids often starts at room temperature. This disturbance of anion-cation equivalence adversely affects the efficiency of the accelerator systems according to the invention. The alkali metal salts of the specific carboxylic acids are however usually more stable and solutions thereof can be prepared for storage and used at any desired time.

It is obvious that the accelerator systems can also be used without solvents in the production of compact synthetic plastics; in such cases this is often the rule. A part of the reactive hydrogen containing compound which is to be reacted with isocyanates is mixed in this case, for example, with the tertiary amine or the alkali and the other with the special carboxylic acid. Volatile fractions such as solvents or water are removed from both, if necessary, and only then are both portions mixed in equivalent quantities, related to the anion and cation of the accelerator system, or in quantities which guarantee a slight excess of the special carboxylic acid. Only then is the polyisocyanate added to the reactive hydrogen containing compound which contains the masked accelerator and the components are then allowed to react at room temperature or preferably at elevated temperatures.

If the tertiary amine is incorporated into the compound containnig reactive hydrogen which is to be reacted with isocyanates, acid may be merely added to this compound with or without solvents in a quantity equivalent to or slightly in excess of the tertiary amine and in this way the accelerator system in accordance with the invention is formed.

The masked accelerators develop their activity somewhat even at room temperature but to a substantially greater extent at higher temperatures. The intensity of the acceleration of the isocyanate reaction proceeds concurrently with the speed of decarboxylation of the particular carboxylic acids. This increases with rising temperature, so that the high efficiency of the accelerators at higher temperatures will be understood. The acceleration effect is of course dependent ot a large extent on the nature of the tertiary amine or the alkali. It is very strong when using alkalis and is also strong with the use of aliphatic or cycloaliphatic amines. The acceleration of the reaction is obviously more marked with larger quantities of accelerator; thus catalytic amounts are contemplated preferably from about 0.001 to about 1 percent by weight.

Solvents also influence to a marked degree the decarboxylation of the special carboxylic acids and thus the efficiency of the accelerators. Ketones and especially acetone have the effect of promoting decarboxylation while aliphatic chlorinated hydrocarbons such as chloroform inhibit such decarboxylation; solvents of the type of ethyl acetate, benzene or dioxane have an intermediate effect.

The accelerating effect is solely dependent on the reaction of the isocyanate group, that is to say, it is observed in the conversion of reactants having reactive hydrogen atoms with monoisocyanates as with polyisocyanates regardless of whether they are of aliphatic, cycloaliphatic or aromatic nature. Thus, it is also possible to catalyze all reactions used in the isocyanate polyaddition process for the production of synthetic plastics. This statement is conversely also applicable for the co-operating components comprising reactive hydrogen atoms which components, in large scale industrial processes, usually contain hydroxyl groups. The reaction of isocyanates with water can, for example, also be successfully accelerated.

By the use of the salts which have been described, not only is the pot life etxended while the acceleration effect is maintained, but with a compound having reactive hydrogen atoms and to which alkalis are added to which for example it has hitherto been practically impossible to add an isocyanate component, since there was immediate swelling of the mixture and therefore such a mixture could not usually be handled industrially, it is now possible by using the accelerators according to the invention to do this. Under the decarboxylation conditions of the particular carboxylic acid component of the salt, however, the full catalytic activity of the alkali or of the tertiary amine then becomes effective. It is thus possible, with the aid of the accelerators described, for the formation of the synthetic plastics to be carried out industrially in a substantially shorter time or under more gentle conditions compared to a mixture which has not been catalyzed.

Examples of compounds with reactive hydrogen atoms are diols of the type HO—R—OH, in which R can be a straight or branched, saturated or unsaturated, bifunctional aliphatic such as ethylene, propylene, butylene and the like, cycloaliphatic such as cyclohexylene or aromatic such as phenylene radical which can also contain hetero atoms such as O, S, N or substituents. Polyols such as glycerine, trimethylolpropane, hexane-1,2,6-triol, pentaerythritol, sorbitol and cellulose as well as cellulose derivatives such as cellulose ether or cellulose ester with hydroxyl groups which are still free are also to be considered as are polyfunctional hydroxyl compounds which are obtained by addition of alkylene oxides to existing polyols or to primary or secondary amines or amino alcohols as well as linear polyalkylene glycol ethers which can be produced by polymerization of the alkylene oxides including ethylene oxide, propylene oxide, butylene oxide, epichlorohydrin, styrene oxide, tetrahydrofuran and the like; included are polyacetals containing hydroxyl groups, as described in German patent specifications 1,039,744 and 1,045,095, or polythioethers which can be prepared in known manner by condensation of thiodiglycol and its derivatives with themselves or other sulphur-free polyhydric alcohols such as ethylene glycol, propylene glycol and the like.

Straight or branched chain polyesters or polyester amides containing predominantly hydroxyl groups and if desired carboxyl groups which are obtainable by known processes from the aforementioned diols and/or polyols or diamines or amino alcohols by condensation with polycarboxylic, hydroxy carboxylic or amino carboxylic acids such as adipic acid, sebacic acid, malonic acid, oxalic acids, 1,4-benzene dicarboxylic acid, 1,3,5-benzene tricarboxylic acid, ricinoleic acid, aminoisocaproic acid and the like can also be used. These polyesters or polyester amides can also contain tertiary nitrogen incorporated therein.

Also suitable are those polyhydroxyl compounds which comprise urethane groups and which have already been so modified with isocyanates that some of the hydroxyl groups have been reacted while the remainder are still available for the further reaction with polyisocyanates. However, there can also be used those compounds containing hydroxyl groups which are obtainable from polyisocyanates of higher molecular weight and produced by reacting a polyoxy compound of the aforementioned type, with an excess of polyisocyanate and thereafter with an excess of a polyol or hydroxy carboxylic acid hydrazide, if desired with concurrent use of a dicarboxylic acid-bis-hydrazide.

It is not important whether the compounds with reactive hydrogen atoms and diisocyanates are used in equivalent ratios or with one or other of the components in a quantity greater or less than the equivalent quantity. The catalysts described can be used in the production of materials of very different types and frequently it is only as a result thereof that a continuous working method becomes economically possible. Thus, they may be used in the production of foam materials and homogeneous synthetic plastics and also in the production of sheet formations, lacquers, adhesives, textile and paper auxiliaries. With salts having a base component of the type.

in which R represents a saturated or unsaturated, straight or branched, alkyl radical with more than 8 carbon atoms and R' represents alkyl radicals with up to 4 carbon atmos. It is also possible, for example, to produce an additional non-tacky effect with sheet formations such as lacquers and coatings.

Any suitable organic isocyanate may be used including aliphatic, cycloaliphatic, alkaryl, aralkyl, heterocyclic and aryl mono- and polyisocyanates such as, for example, ethyl isocyanate, propyl isocyanate, butyl isocyanate, pentyl isocyanate, hexyl isocyanate, heptyl isocyanate, octyl isocyanate and the like including eicosyl isocyanate. As diisocyanates, there may be used tetramethylene diisocyanate, pentamethylene diisocyanate, octamethylene diisocyanate, dodecamethylene diisocyanate, 3,3'-diisocyanato dipropyl ether, cyclohexyl isocyanate, tetrahydro-alpha-naphthyl isocyanate, tetrahydro-beta-naphthyl isocyanate, xylylene diisocyanates, p,p'-diphenylmethane diisocyanate, beta,beta'-diphenyl propane-4,4'-diisocyanate and the like. Other examples are benzyl isocyanate, undecamethylene diisocyanate, p-isocyanato benzyl isocyanate, phenyl isocyanate, p-dodecyl phenyl isocyanate, 5-dodecyl-2-methyl phenyl isocyanate, 3-nitro-4-dodecyl phenyl isocyanate, p-cetyloxy phenyl isocyanate, m-phenylene diisocyanate, p-phenylene diisocyanate, 1-methyl phenylene-2,4-diisocyanate, naphthylene-1,4-diisocyanate, naphthylene-1,5-diisocyanate, 2,6-toluylene diisocyanate, 1,3,5-benzene triisocyanate, p,p'p''-triphenylmethane triisocyanate tetrahydrofurfuryl isocyanate and the like. Also, the addition products of polyisocyanates with a deficient quantity of a low molecular weight alcohol such as 1,4-butane diol, glycerine, trimethylolpropane, the hexane diols and hexane triols and addition products of the aforementioned polyisocyanates with low molecular weight polyesters such as castor oil may also be used as well as the reaction products of the aforementioned polyisocyanates with acetals as described in copending application Serial No. 821,360. Also suitable are the isocyanate polymers described in German specifications Nos. 1,022,789 and 1,027,094, as laid open to inspection. Mixtures of organic isocyanates may also be employed. The process according to the present invention can also be used for the reaction of the "initial adducts" obtained from the aforementioned organic compounds containing at least two active hydrogen containing groups and an excess of polyisocyanate by adding water.

One may also use biuret polyisocyanates of the general formula:

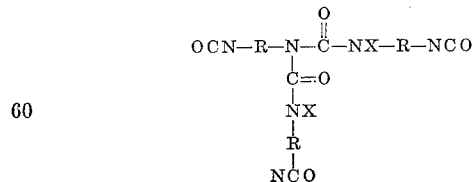

in which R is an aliphatic, hydroaromatic, araliphatic including aralkyl or an aromatic radical, which may or may not be substituted with halogen, such as chlorine, NO$_2$, an alkyl radical, an alkoxy radical or the like. R should not contain any hydrogen atoms which are reactive with an —NCO group. X is either hydrogen or the grouping —CO—NX—R—NCO in which X has the same meaning. The polyisocyanates having the biuret structure may be prepared by reacting in a neutral solution water with a monomeric organic diisocyanate in the ratio of 1 mol water to 3 mols diisocyanate or by reacting a monomeric organic diisocyanate with urea diisocyanate of the formula:

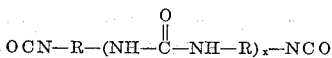

in which R is an aliphatic, hydroaromatic, araliphatic or an aromatic radical, which may or may not be substituted with halogen such as chlorine, an $NO_2$ group, an alkyl radical, an alkoxy radical or the like, and $x$ is from 1 to 5.

Any suitable crude isocyanate may be used such as, for example, crude toluylene diisocyanates obtained by the phosgenation of a mixture of toluylene diamines or crude diphenyl methane isocyanates obtained by the phosgenation of crude diphenyl methane diamine. Crude diphenyl methane diamine is the reaction product of aniline and formaldehyde in the presence of HCl and contains some tri- and higher polyamines. A preferred unrefined or crude isocyanate is one having from about 26 to about 33 percent free —NCO and an amine equivalent of about 120 to about 150 such as, for example, a product having about 32 percent free —NCO and an amine equivalent of about 140. A specific crude isocyanate suitable for use in accordance with the present invention may be obtained by reacting about 60 parts of aniline with about 25 parts of formaldehyde (37 percent aqueous) and about 74 parts of HCl (30 percent aqueous) at a temperature of about 90° C. to about 100° C. for about 1.5 to about 2 hours and then reacting this product with NaOH and separating out the crude amine. About 100 parts of phosgene are then reacted with the crude amine until a product having an amine equivalent of about 135 and containing about 31 percent free —NCO is obtained. The free excess phosgene and substantially all of the solvents used, if any, are then removed. When toluylene diisocyanates, for example, are produced by conventional phosgenation of the corresponding diamines, a product containing about 90 percent 2,4- and 2,6-toluylene diisocyanate and the balance a crude residue of imidazoles and the like resulting in the phosgenation is obtained from the phosgenator. This product may also be used. It is preferred to phosgenate a mixture of ortho- and para-toluylene diamines. A specific product is the undistilled reaction mixture obtained by the phosgenation of 80 percent 2,4- and 20 percent 2,6-toluylene diamine containing 90 percent of a mixture of about 80 percent 2,4- and 20 percent 2,6-toluylene diisocyanate and the balance polymers incapable of accurate analysis.

The commercially available crude 4,4'-diphenyl methane diisocyanate having an assay of 90 percent maximum, an amine equivalent of 141 maximum, about 0.04 to about 0.4 percent by weight hydrolyzable chloride, about 0.1 to about 0.6 percent by weight total chloride and having a flash point of about 430° F, may be used. As pointed out above, when toluylene diisocyanate, for example, is produced by conventional phosgenation of the corresponding diamine, a product containing about 90 percent 2,4- and 2,6-toluylene diisocyanate is obtained from the phosgenator. Of course, the product from the phosgenator is subjected to distillation to remove the solvent so that a product having 90 percent of 2,4- and 2,6-toluylene diisocyanate is obtained. The initial product from the phosgenator in most cases contains about 80 percent by weight of solvent. The 2,4- and 2,6-toluylene diisocyanate may be mixed with any suitable amount of the residue obtained if the isocyanate is refined and then reconstituted. In this event, it is preferred to have at least 50 percent of the refined isocyanate present. The crude polyisocyanates disclosed in U.S. Patent 2,950,307 are suitable.

The cellular polyurethane plastics are produced in accordance with the invention by the simultaneous intensive mixing of the components including the organic compound containing at least two active hydrogen containing groups, the organic polyisocyanate and the tertiary amine salt together with water and/or other additives. The mixing of these components is preferably effected mechanically for example in the manner described in U.S. Reissue Patent 24,514 to Hoppe et al., issued August 12, 1958. It is also possible to prepare a prepolymer by reaction of the organic polyisocyanate and the organic compound containing at least two active hydrogen containing groups in a first step and then reacting the resulting isocyanate terminated prepolymer with water in a second step in the presence of the tertiary amine salt of the present invention to prepare a cellular polyurethane plastic.

A wide range of different additives can be added to the reaction mixture in the production of cellular polyurethane plastics. Thus, it is sometimes convenient to use emulsifiers such as, for example, sulphonated castor oil and/or adducts of ethylene oxide with hydrophobic compounds containing one or more active hydrogen atoms, foam stabilizers such as, for example, siloxane oxyalkylene block copolymers having the formula

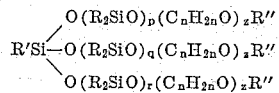

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene block containing from 15 to 19 oxyethylene units and from 11 to 15 oxypropylene units with $z$ equal to from about 26 to about 34 or similar stabilizer. A process which combines the catalyst and this stabilizer is contemplated by the invention as a preferred embodiment. Silicone compounds represented by the above formula and a method for making them are disclosed in U.S. Patent 2,834,748 to Bailey et al.

The cellular polyurethane plastics produced in accordance with the present invention have excellent mechanical and physical properties and their bulk density can be modified in known manner by varying the quantity of polyisocyanate and water employed in their production. Cellular polyurethane plastics may be used in a variety of commercial applications including both thermal and sound insulation, cushions, upholstery units, crash pads and arm rests for automobiles and the like. Non-porous polyurethane plastics have good abrasion and tear resistance and can be used in the production of gears, gaskets, driving members, accumulation bladders, automobile tires and a whole host of other applications.

The process of the invention can be used for the preparation of castings, moldings and coating compositions including for example caulks, sealants, putties, adhesives and surface coatings. Castings are prepared by mixing either a monomeric organic polyisocyanate or the above-described isocyanate terminated prepolymer with an organic compound containing active hydrogen containing groups which are reactive with an isocyanate group, preferably under anhydrous conditions. Best results are obtained when an isocyanate modified organic compound is reacted with an hydroxyl bearing organic compound having a molecular weight between about 90 and about 2000 and an hydroxyl number between about 56 and about 940. Thus, for the production of hard, rigid materials one may use low molecular weight compounds having higher functionality based on hydroxyl groups and for flexible materials one may use high molecular weight compounds with lower functionality based on hydroxyl groups. The resulting composition may be employed as a caulk, sealant or a putty for many useful applications. The composition has properties which are comparable to those obtained from the unfilled polyurethane plastic. Indeed, in many instances the physical properties of the casting are improved with regard to tensile strength and elongation. Excellent results are obtained from the reaction of an aromatic diisocyanate such as a mixture of 80 percent 2,4- and 20 percent 2,6-toluylene diisocyanate with an hydroxyl polyester, a polyhydric polyalkylene ether or polyhydric polythioether having two to four terminal hydroxyl groups in a first step to prepare an isocyante modified prepolymer and then reacting the resulting product with a mixture containing approximately the stoichiometric amount of polyol, having from two to six hydroxyl groups, necessary to react with all of the terminal —NCO groups.

In accordance with another embodiment of the invention, moldings can be prepared by reacting the organic polyisocyanate with an organic compound containing at least two active hydorgen containing groups in a kneader or other suitable mixing device, to obtain a crumbly mass which is then further reacted with an organic polyisocyanate, a polyamine, a polyol, water or other suitable cross-linking agent on a rubber mill and finally pressed into a mold and allowed to cure. Suitable processes for carrying out this type of reaction may be found in U.S. Patents 2,621,166 and 2,900,368.

Coating compositions can be prepared by reacting an oragnic polyisocyanate or isocyanate modified prepolymer as described above with an organic compound containing at least two active hydrogen containing groups and, if desired, in an inert organic solvent therefor. Any suitable inert organic solvent may be used such as, for example, xylene, ethyl acetate, toluene, ethylene glycol monoethylether acetate and the like. The resulting coating composition can be applied in any suitable fashion as by dipping, brushing, roller coating and the like, but is preferably applied by spraying onto the substrate. Any suitable substrate may be coated with the coating compositions of the invention such as, for example, wood, paper, porous plastics such as, for example, sponge rubber, cellular polyurethane plastics, foamed polystyrene and the like as well as metals such as steel, aluminum, copper and the like. The coating composition need not contain a solvent for all applications. The coating composition of the invention may contain any suitable pigment such as, for example, iron oxide, carbon black, titanium dioxide, zinc oxide, chrome green, lithol red and the like. Flexible, chemically resistant coatings are obtained in accordance with the process of the invention. The coating compositions can also be used as adhesives in accordance with the present invention by applying the coating composition to a substrate to be bonded.

The invention is further illustrated by the following examples in which the parts are by weight unless otherwise indicated.

EXAMPLE 1

The mixtures $a$ to $e$ mentioned in the following table are prepared and films are produced therefrom on steel plates by brushing. These films, with the mixtures $a$, $b$, $d$ and $e$ lead to cross-linked, elastic films after a heat treatment of about 4 minutes at about 100° C. On the other hand, the coating formed by mixture $c$ is not cross-linked and is still soluble in organic solvents after the same treatment:

Table

|  | a | b | c | d | e |
| --- | --- | --- | --- | --- | --- |
| Grams of polyester A | 100 | 100 | 100 |  |  |
| Grams of polyester B |  |  |  | 100 | 100 |
| Grams of polyisocyanate | 52 | 52 | 52 | 52 | 52 |
| Dimethyl stearyl amine (normal solution in ethyl acetate) | 9.6 | 9.6 |  |  |  |
| Trichloroacetic acid (normal solution in methylene chloride) |  | 10 |  | 11 |  |
| Grams of ethyl acetate | 20 | 20 | 20 |  | 10 |
| Grams of methyl glycol ether acetate | 8 |  | 16 | 20 | 20 |
| Pot life of the mixtures | (¹) | (²) | (²) | (³) | (⁴) |

¹ Solid after 30 minutes.
² Still liquid after 10 hours.
³ Still liquid after 30 hours.
⁴ Solid after 6 hours.

Polyester A is prepared from about 1168 parts of adipic acid, about 912 parts of diethylene glycol and about 35.7 parts of trimethylolpropane (—OH number 60, acid number 1.4, viscosity 10,070 cp. at 25° C.). Polyester B is obtained from about 1168 parts of adipic acid, about 890 parts of diethylene glycol, about 35.7 parts of trimethylolpropane and about 23.8 parts of N-methyl diethanolamine (—OH number 58.7, acid number 1, viscosity 11,380 cp. at 25° C.). The polyisocyanate is the reaction product of 1 mol of trimethylolpropane and 3 mols of a mixture of 80 percent, 2,4- and 20 percent 2,6-toluylene diisocyanate having an —NCO content of 8.7 percent and is used as the 50 percent solution in ethyl acetate.

EXAMPLE 2

Approximately a 20 percent aqueous potassium hydroxide solution is added to a branched polyhydric polypropylene ether (—OH number 380) obtained by addition of propylene oxide to trimethylolpropane and the water is then removed in vacuo at about 100° C. About 100 parts of the polyhydric polypropylene ether prepared in this manner consumes about 11.75 ml. of normal hydrochloric acid on titration with bromophenol blue as indicator, this corresponding to a potassium hydroxide content in the polyether of 0.658 percent by weight.

To this polyether, there are added about 13 ml. of normal trichloroacetic acid in ethyl acetate and about 300 parts of a 50 percent solution in ethyl acetate of the polyisocyanate of Example 1. If this mixture is applied to a steel panel and heated for about 3 minutes to about 100° C., a tough, hard, cross-linked lacquer film is obtained on the support, this film being insoluble in the conventional organic solvents. The pot life of the mixture is about 4 hours. With a mixture of the same type, but without addition of trichloroacetic acid, it is practically impossible to carry out the incorporation by mixing of the polyisocyanate since an immediate reaction of the components leads to a cross-linked synthetic plastic.

If the polyisocyanate described is replaced by 180 parts of a polyisocyanate having the formula

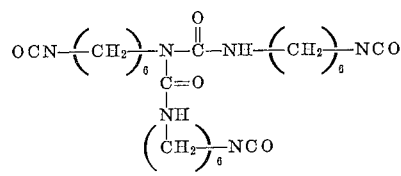

obtained by reacting hexamethylene diisocyanate with less than an equivalent quantity of water (percent of —NCO in the 75 percent solution in ethyl acetate, 16.0), a similarly cross-linked, tough, lacquer film is obtained after the coating has been heat treated for about 4 minutes at about 100° C. which film in thick layers has a decorative wrinkled surface. The pot life of the mixture is more than 20 hours. When working under conditions which are otherwise the same but without using trichloroacetic acid, the pot life is of the order of a few minutes.

EXAMPLE 3

About 50 parts of a substantially anhydrous polyhydric polypropylene ether (—OH number 380) obtained by addition of propylene oxide to trimethylolpropane and containing 0.658 percent by weight of potassium hydroxide are thoroughly mixed with about 50 parts of the same polyhydric polypropylene ether with a content of 2 percent by weight of trichloroacetic acid and about 58 parts of hexamethylene diisocyanate are added. After a heat treatment for about 3 minutes at about 100° C., the mixture is solidified into a cross-linked plastic. The pot life of the mixture is about 10 hours. When working without trichloroacetic acid in the polyhydric polypropylene ether, a homogeneous incorporation by mixing of the diisocyanate is practically impossible because of immediate reaction of the components.

EXAMPLE 4

About 1000 parts of an hydroxyl polyester (acid number 1.4, —OH number 54.9, viscosity 10,600 cp. at 25° C.) obtained from adipic acid and 1,2-propylene glycol are reacted with about 145 parts of toluylene-2,4-diisocyanate for one hour at about 80° C. About 127 parts of ethyl acetate are then added and the mixture is heated for a further period until the 90 percent solution shows an —NCO content of about 2.05 percent by weight at a viscosity of about 3400 cp. at 25° C. About 1000 parts of this solution are mixed at about 50° C. with about 330 parts of methyl glycol ether acetate, about 570 parts of ethyl acetate and then with a solution of about 39.4 parts of dihydroacrylic acid bis hydrazide and about 8.65 parts of hydroxy butyric acid hydrazide in about 70 parts of dimethyl formamide, the solution being at a temperature of about 120° C. In a few minutes, a transparent solution with a viscosity of about 7800 cp. at 50° C. is formed. About 1000 parts of the solution are mixed with about 50 parts of a 75 percent solution in ethyl acetate of the polyisocyanate prepared from 1 mol of trimethylolpropane and 3 mols of a mixture of 80 percent 2,4- and 20 percent 2,6-toluylene diisocyanate, the polyisocyanate having an —NCO content of about 13.5 percent (calculated on solution), about 15 ml. of a normal solution of trichloroacetic acid in methylene chloride and about 14.5 ml. of a normal solution of dimethyl stearyl amine in ethyl acetate. After evaporating the solvent, cross-linked elastic films are obtained in about 2 minutes by heating to about 115° C. Without addition of accelerators, higher temperatures and longer times are required for producing a cross-linked film. The pot life of the catalyzed mixture is more than 10 hours, whereas that of a mixture to which dimethyl stearyl amine but not trichloroacetic acid has been added is only about 30 minutes. Using the combination described, it is possible for support materials to be coated with several layers on both sides without any danger of tackiness when the coated materials are rolled up.

EXAMPLE 5

A mixture is prepared from about 300 parts of a linear polyester (acid number 1.4, —OH number 54.9, viscosity 10,600 cp. at 25° C.) obtained from 1,2-propylene glycol and adipic acid, about 88 parts of ethyl acetate and about 145 parts of a 50 percent solution in ethyl acetate of the polyisocyanate of Example 1.

About 5.6 ml. of normal solution in ethyl acetate of 3,3'-bis-dimethyl amino dipropyl ether and about 6 ml. of normal solution of trichloroacetic acid in methylene chloride are added to about 100 parts of this mixture, containing about 70 percent by weight of solid substance. Coatings of this mixture solidify in the course of about 4 minutes at about 120° C. into a flexible soft film. The pot life of the mixture is more than 10 hours in contrast to a similar mixture without trichloroacetic acid which becomes solid after 2 hours. The uncatalyzed mixture shows practically no change in viscosity after being kept for about 3 days at room temperature and also does not cross-link under the conditions indicated.

EXAMPLE 6

About 1.6 parts of a 50 percent solution in ethyl acetate of the polyisocyanate of Example 1, about 1 ml. of a normal solution of 3,3'-bis-dimethyl amino dipropyl ether in ethyl acetate, as well as about 1.2 ml. of normal trichloroacetic acid in methylene chloride are added to about 100 parts of approximately a 7.8 percent solution in methyl acetate of acetyl cellulose (hydroxyl content 0.65 percent, calculated on solid substance). Coatings of this mixture combination, after being heated for about 5 hours at about 100° C., form a transparent hard film which is insoluble in acetone. The pot life of the mixture is more than 20 hours. After this time, a lacquer mixture of similar structure but without addition of trichloroacetic acid becames swelled and can no longer be processed. If the operation is carried out without adding accelerators, a pot life longer than 20 hours is observed, but the lacquer films do not cross-link under the above heating conditions.

EXAMPLE 7

By adding approximately a 20 percent aqueous potassium hydroxide solution to a branched polyhydric polypropylene ether (—OH number 380) obtained by addition of propylene oxide to trimethylolpropane and by subsequent dehydration in vacuo at about 100° C., a polyhydric polypropylene ether having an alkaline reaction and a KOH content of about 0.384 percent by weight is produced. About 10 parts of this alkalized polyhydric polypropylene ether are mixed with about 9.5 parts of the same polyhydric polypropylene ether with a trichloroacetic acid content of 1.23 percent by weight and about 11 parts of 1,6-hexamethylene diisocyanate are then added. If this mixture is heated to about 110° C., there is observed in a few minutes a solidification into a cross-linked synthetic plastic partially permeated with bubbles or blisters. The mixture has a pot life of several hours. When working without trichloroacetic acid, it is practically impossible for the hexamethylene diisocyanate to be mixed with the alkalized polyhydric polypropylene ether, since there is immediate solidification of the mixture.

With the use of an excess of hexamethylene diisocyanate, for example of about 16 to about 21 parts based on the aforementioned quantities of polyether, cross-linked synthetic plastics are similarly obtained after brief heating to about 110° C. Using these mixtures, particularly high-quality, lustrous and flexible lacquer coatings are obtained on support materials after heating for about 5 minutes at about 110° C.

EXAMPLE 8

About 2000 parts of a polyester containing adipic acid and diethylene glycol (acid number 1.7, —OH number 40.7, viscosity 765 cp. at 75° C.) are reacted with about 254.4 parts of 1,6-hexamethylene diisocyanate at about 85° C. to an —NCO value of about 2.6 percent and thereafter about 2.2 parts of benzoyl chloride are added and after cooling to about 60° C., about 560 parts of acetone are added. The resulting solution has an —NCO content of about 2.06 percent and a viscosity of about 2530 cp. at 25° C. A mixture of 4.1 ml. of a 6-normal aqueous solution of trichloroacetic acid and about 4 ml. of an aqueous potassium hydroxide solution is added to about 100 parts of the aforementioned solution. Using this combination, after evaporation of the solvent and brief heating to about 100 to about 110° C., highly elastic films are obtained on support materials. By dilution with further fractions of solvents such as acetone and ethyl acetate to a solution containing about 50 percent solids, it is possible to use the solution to impregnate textile fabrics and also to solidify fiber fleeces. The high elasticity of the synthetic plastic cross-linked with water which is formed after the final heating has a very advantageous effect, especially with regard to the fixing of fleeces since crease-proof fleeces are obtained. The pot life of the combination is several hours whereas a similar mixture without addition of trichloroacetic acid solidifies after a few minutes.

EXAMPLE 9

About 100 parts of approximately at 50 percent solution in ethyl acetate of a polyester (7 percent —OH) obtained from adipic acid, 1,3-butylene glycol and trimethylolpropane are mixed with about 145 parts of a 50 percent solution of a polyisocyanate of Example 1 in which polyisocyanate, the free —NCO groups have been reacted with phenol. To approximately 50 part lots of this mixture, there are added:

(a) About 4.8 ml. of a normal solution in ethyl acetate of

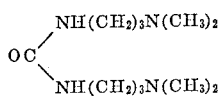

and about 5.0 ml. of normal solution in ethyl acetate of trichloroacetic acid, (b) About 4.8 ml. of normal solution in ethyl acetate of

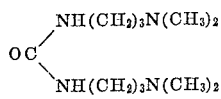

and (c) no additive.

After being kept for about 6 days at room temperature, the mixture (b) has thickened considerably whereas the mixtures (a) and (c) show practically no changes in viscosity as compared with the time immediately after the mixing. By heating for about 5 hours to about 140° C., a cross-linked insoluble lacquer film is obtained from mixture (a) whereas the film from mixture (c) is still soluble in ethyl acetate after the same treatment.

EXAMPLE 10

About 1500 parts of a polyester obtained from adipic acid and diethylene glycol (acid number 1.7, —OH number 40.7, viscosity 765 cp. at 75° C.) are heated with about 191 parts of 1,6-hexamethylene diisocyanate for about one hour at about 80° C. and then mixed with about 188 parts of methyl glycol ether acetate. The 90 percent solution of the initial adduct containing isocyanate has an —NCO content of about 2.25 percent and a viscosity of about 28,000 cp. at 25° C. About 1 part of potassium trichloroacetate in about 10 parts of ethyl acetate is added to about 100 parts of this initial adduct. Coatings of this combination on support materials are solidified after heating for about 5 hours at about 120° C. into elastic, highly cross-linked films. The pot life of the mixture is about 8 hours. Films with similar properties and with improved resistance to scratching are obtained if about 1.6 or about 0.8 part of 1,4-butane diol are also added to the above mixture.

It is to be understood that any other suitable organic polyisocyanate, active hydrogen compound, salt or the like could have been used in these examples since they are for the purpose of illustration provided that the teachings of the disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method of catalyzing the reaction between an organic polyisocyanate and an organic compound containing active hydrogen containing groups as determined by the Zerewitinoff method which comprises reacting said components while mixed with a salt of a carboxylic acid, having a dissociation constant greater than about $1 \times 10^{-3}$ which decompose by decarboxylation to carbon dioxide and an organic compound, and a member selected from the group consisting of tertiary amines, alkali metals and quaternary ammonium ions.

2. The method of claim 1 wherein said carboxylic acid is trichloroacetic acid.

3. The method of claim 1 wherein said carboxylic acid is a monocarboxylic acid.

4. A polyurethane coating composition having improved pot life which comprises a mixture of an organic polyisocyanate, an organic compound containing active hydrogen containing groups as determined by the Zerewitinoff method and a catalytic amount of a salt of a monocarboxylic acid, having a dissociation constant greater than about $1 \times 10^{-3}$ which decomposes by decarboxylation to carbon dioxide and an organic compound, and a member selected from the group consisting of tertiary amines, alkali metals and quaternary ammonium ions in an inert organic solvent.

5. The polyurethane coating composition of claim 4 wherein said group member is a tertiary amine and said carboxylic acid is trichloroacetic acid.

6. The polyurethane coating composition of claim 4 wherein said organic compound containing active hydrogen containing groups is a polyether.

7. The polyurethane coating composition of claim 4 wherein said organic compound containing active hydrogen containing groups is a polyester.

8. The polyurethane coating composition of claim 4 wherein said organic solvent is chloroform.

9. The polyurethane coating composition of claim 4 wherein said inert organic solvent is acetone.

10. The polyurethane coating composition of claim 4 wherein said inert organic solvent is ethyl acetate.

11. The polyurethane coating composition which comprises an ethyl acetate solution of (a) the reaction product of 3 mols of toluylene diisocyanate with 1 mol of trimethylolpropane, (b) the reaction product of trimethylolpropane with propylene oxide having an hydroxyl number of about 380, and (c) a catalytic amount of the salt 3,3'-bis-dimethyl amino dipropyl ether and trichloroacetic acid.

12. A method of catalyzing the reaction between an organic polyisocyanate and an organic compound containing predominantly free hydroxyl groups which comprises reacting said components while mixed with a salt of a tertiary amine and a carboxylic acid selected from the group consisting of trichloroacetic acid, tribromoacetic acid, chlorodibromoacetic acid and nitroacetic acid.

References Cited by the Examiner

UNITED STATES PATENTS

| 2,886,555 | 5/1959 | Bunge et al. | 260–31.2 |
|---|---|---|---|
| 2,901,467 | 8/1959 | Croco | 260–31.2 |
| 2,978,449 | 4/1961 | France et al. | 260–77.5 |
| 3,012,984 | 12/1961 | Hudson | 260–31.2 |
| 3,108,975 | 10/1963 | Lambert | 260–77.5 |

OTHER REFERENCES

Saunders: Polyurethanes: Chemistry and Technology, Part I, Chemistry; Interscience Publishers, 1962, page 213.

MORRIS LIEBMAN, *Primary Examiner.*